US006676525B2

United States Patent
Uehara

(10) Patent No.: US 6,676,525 B2
(45) Date of Patent: Jan. 13, 2004

(54) DAMPER MECHANISM

(75) Inventor: Hiroshi Uehara, Hirakata (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 10/131,021

(22) Filed: Apr. 25, 2002

(65) Prior Publication Data

US 2002/0173361 A1 Nov. 21, 2002

(30) Foreign Application Priority Data

May 15, 2001 (JP) ........................................ 2001-145451

(51) Int. Cl.[7] .............................. F16D 3/52; F16D 3/66; F16D 3/12
(52) U.S. Cl. ...................... 464/68; 192/205; 192/211; 192/213
(58) Field of Search ........................ 464/68, 67, 66; 192/205, 211, 213, 213.3; 74/574

(56) References Cited

U.S. PATENT DOCUMENTS 3,809,198 A * 5/1974 Mori ...................... 192/210.1
4,787,877 A * 11/1988 Nagao et al. ................. 464/64
4,892,008 A * 1/1990 Naudin et al. ................ 74/574
5,038,906 A * 8/1991 Minbu ....................... 192/205
5,609,526 A * 3/1997 Kitayama et al. ............. 464/68
5,752,885 A * 5/1998 Kobayashi et al. ........... 464/68
6,375,575 B2 * 4/2002 Hashimoto ................... 464/68

* cited by examiner

Primary Examiner—Lynne H. Browne
Assistant Examiner—Kenn Thompson
(74) Attorney, Agent, or Firm—Shinjyu Global IP Counselors, LLP

(57) ABSTRACT

A damper mechanism having preferable torsion characteristics that exhibit different characteristics on positive and negative sides by way of a simplified structure is provided. In the damper mechanism, a hub 6 is rotatable with respect to plates 12 and 13. Coil springs 33 are compressed on positive and negative sides of torsion characteristics. Elastic members 36 are arranged to operate in a rotating direction in parallel with the coil springs 33. The elastic members 36 are compressed on the positive side of the torsion characteristics, but are not compressed on the negative side of the torsion characteristics until a torsion angle exceeds a predetermined value. The elastic members 36 generate a frictional resistance when being compressed in the rotating direction, but no other friction generating mechanism is employed.

21 Claims, 11 Drawing Sheets

DAMPER MECHANISM

BACKGROUND OF THE INVENTION

1. Field of the Invention

This invention generally relates to a damper mechanism. More specifically, the present invention relates to a damper mechanism for transmitting a torque while absorbing and damping torsional vibrations.

2. Background Information

A damper mechanism used in a clutch disk assembly of a vehicle has, e.g., an input rotary member, an output rotary member, and an elastic coupling mechanism. The input rotary member is releasably coupled to an input flywheel. The output rotary member is coupled to an input shaft of a transmission. The elastic coupling mechanism elastically couples the rotary members in a rotating direction. The input rotary member is formed of a clutch disk and a pair of input plates fixed to the clutch disk. The output rotary member is formed of a hub, which is unrotatably and axially movably coupled to the transmission input shaft. The hub is formed of a cylindrical boss and a radial flange. The cylindrical boss is spline-engaged with the transmission input shaft, and the radial flange is formed around the boss. The elastic coupling mechanism is formed of a plurality of elastic member assemblies. Each elastic member assembly is formed of a single coil spring or a combination of the coil spring and seat members arranged on opposite ends of the coil spring. Each elastic member assembly is arranged in a window aperture formed in the flange, and is supported at its opposite ends in the rotating direction. Each elastic member assembly is supported in various directions by edges of windows formed in the input plate pair.

In the structure described above, when the input plate pair rotates relatively to the hub, the coil springs are compressed in the rotating direction between the input plates and the hub. Thereby, torsional vibrations supplied to the clutch disk assembly are absorbed and damped by the damper mechanism.

In general, noises generated from a drive system due to torsional vibrations can be classified into groups, each including noises during idling, noises during constant-speed driving, noises during acceleration and deceleration, and muffled or confined noises. For absorbing the torsional vibrations, which may cause these noises, it is therefore necessary to determine the appropriate torsion characteristics for the damper mechanism. Therefore, some conventional damper mechanisms have employed two-stage characteristics. A conventional two-stage damper mechanism achieves a low rigidity and a low hysteresis torque in a region of a small torsion angle for absorbing vibrations during idling. In these conventional two-stage characteristics, the region of high torsion angles may be divided into a region exhibiting an intermediate rigidity and a high hysteresis torque for absorbing muffled noises, as well as a region exhibiting a high rigidity and a high hysteresis torque for absorbing vibrations and noises during acceleration.

In an FF (Front-engine and Front-drive) vehicle, a drive system has a high rigidity so that a resonance point remains in a practical operation range even if the torsion rigidity is reduced for the purpose of improving performance relating to suppression of noises and vibrations. Characteristics of engine speed variations are different between the positive or acceleration side and the negative or deceleration side. In a conventional structure, however, no difference is present in the torsion characteristics between the positive and negative sides. Therefore, even if good damping characteristics can be realized on one side, good damping characteristics cannot be realized on the other side. Thus, good damping characteristics cannot be realized on both the sides.

In connection with the vibration damping performance relating to variations in rotation speed of the transmission with respect to the engine rotation speed, the hysteresis torque can suppress resonance on the positive side, but cannot achieve an adequate damping rate in a positive range lower than the resonance point and the whole negative range. Conversely, the low hysteresis torque can achieve adequate damping rates in the positive range lower than the resonance point and the whole negative range, but cause large variations in rotation speed at the positive resonance point. If the torsion characteristics on the positive side are similar to those on the negative side, and particularly if no difference is present in hysteresis torque between the positive and negative sides, it is impossible to provide torsional damping characteristics that are preferable over the whole operating range of the damper mechanism.

A structure in which the number of elastic members operating on the positive side is larger than the number of elastic members operating on the negative side is known. This structure can thereby provide a rigidity on the positive side that is different from a rigidity on the negative side. Additionally, a structure in which friction generated on the positive side by a friction generating mechanism is different in magnitude from that on the negative side is known as well. However, the friction generating mechanism requires a plurality of friction washers and conical springs, and thus requires a complicated structure formed of a large number of parts.

In view of the above, there exists a need for damper mechanism that which overcomes the above mentioned problems in the prior art. This invention addresses this need in the prior art as well as other needs, which will become apparent to those skilled in the art from this disclosure.

SUMMARY OF THE INVENTION

An object of the invention is to provide a damper mechanism with a simplified structure that can achieve the preferable vibration damping characteristics by providing different torsion characteristics on the positive and negative sides.

According to a first aspect of the present invention, a damper mechanism includes a first rotary member, a second rotary member, a first elastic member, a second elastic member, and a friction generating mechanism. The second rotary member is rotatable with respect to the first rotary member. The first elastic member couples the first and second rotary members together in a rotating direction. The first elastic member is compressed in the rotating direction when relative rotation occurs between the first and second rotary members, and is compressed on positive and negative sides of torsion characteristics. The second elastic member couples the first and second rotary members together in the rotating direction. The second elastic member is compressed in the rotating direction when relative rotation occurs between the first and second rotary members, and is arranged to operate in parallel in the rotating direction with respect to the first elastic member. The second elastic member is compressed on the positive side of the torsion characteristics, and is compressed on the negative side of the torsion characteristics only in a range exceeding a predetermined torsion angle. The friction generating mechanism generates a friction resistance only when the second elastic member is compressed in the rotating direction.

According to the damper mechanism described above, when the first and second rotary members rotate relatively to each other, the first and second elastic members are compressed therebetween to provide predetermined torsion characteristics. On the positive side of the torsion characteristics, the first and second elastic members are compressed to provide a predetermined rigidity. Further, the friction generating mechanism generates friction in accordance with compression of the second elastic member. On the negative side of the torsion characteristics, only the first elastic member is compressed before the torsion angle exceeds a predetermined value. Thus, the second elastic member is not compressed, and the friction generating mechanism does not generate friction. Owing to the above operations, such characteristics can be achieved on the negative side that rigidity is low, and friction is not generated by the friction generating mechanism.

In summary, this damper mechanism can provide characteristics in which a predetermined rigidity and hysteresis torque are produced on the positive side acceleration side of the torsion characteristics, and low rigidity and extremely low hysteresis torque are produced on the negative side or deceleration side of the torsion characteristics. As a result, it is possible to suppress variations in rotation speed, which may occur when passing through the resonance point, on the positive side of the torsion characteristics. Also, good damping rates can be realized throughout the negative side of the torsion characteristics. In particular, the resonance point can be lowered to a range of small variations in engine speed because the characteristics of a low rigidity on the deceleration side can be achieved by not compressing the second elastic member. Therefore, variations in engine speed do not increase even when resonance occurs. Accordingly, it is possible to eliminate a friction generating portion that operates on the deceleration side. Thus, the damper mechanism can be structured to have a simplified structure with regards to the member of parts.

According to a second aspect of the present invention, a damper mechanism includes a first rotary member, a second rotary member, a first elastic member, a second elastic member, and a friction generating mechanism. The first rotary member is formed of a pair of circular plate members aligned in an axial direction and provided with a plurality of spring support portions. The second rotary member has a plate portion arranged between the pair of circular plate members and provided with a plurality of spring accommodating apertures, and is directly and axially contactable with the paired circular plate members. The first elastic member is arranged in the spring support portion and the spring accommodating aperture. The first elastic member is compressed on the positive and negative sides of torsion characteristics when relative the rotation occurs between the first and second rotary members. The second elastic member is arranged in the spring support portion and the spring accommodating aperture. The second elastic member is compressed on the positive side of the torsion characteristics when the relative rotation occurs between the first and second rotary members. However, the second elastic member is compressed on the negative side of the torsion characteristic only in a range exceeding a predetermined torsion angle. The friction generating mechanism generates a friction resistance only when the second elastic member is compressed in the rotating direction.

According to the damper mechanism of the above aspect, when the first and second rotary members rotate relatively to each other, the first and second elastic members are compressed therebetween to provide predetermined torsion characteristics. On the positive side of the torsion characteristics, the first and second elastic members are compressed to provide predetermined characteristics. Further, the friction generating mechanism generates friction in accordance with compression of the second elastic member. On the negative side of the torsion characteristics, however, only the first elastic member is compressed before the torsion angle exceeds a predetermined value. Thus, the second elastic member is not compressed, and the friction generating mechanism does not generate friction. Owing to the above operations, low rigidity characteristics can be realized on the negative side. Further, friction is not generated by the friction generating mechanism.

In summary, this damper mechanism can provide characteristics in which the predetermined rigidity and hysteresis torque are produced on the positive side or acceleration side of the torsion characteristics, and low rigidity and extremely low hysteresis torque are produced in the negative side or deceleration side of the torsion characteristics. As a result, it is possible to suppress variations in rotation speed, which may occur when passing through the resonance point, on the positive side of the torsion characteristics. Also, good damping rates can be achieved throughout the negative side of the torsion characteristics. In particular, the resonance point can be lowered to a range of small variations in engine speed because the characteristics of a low rigidity on the deceleration side can be achieved by not compressing the second elastic member. Therefore, variations in engine speed do not increase even when resonance occurs. Accordingly, it is possible to eliminate a friction generating portion that operates on the deceleration side so that the damper mechanism can have a simple mechanism. More specifically, the first and second rotary members can directly and axially contact each other, and a conventional friction generating mechanism can be eliminated from between them. The result is a damper mechanism with a simplified structure relative to conventional damper mechanism.

According to a third aspect of the present invention, the damper mechanism of the first or second aspect further has a feature such that the friction generating mechanism is arranged in the second elastic member.

According to a fourth aspect of the present invention, the damper mechanism of the third aspect further has a feature such that the second elastic member is formed of an elastic member having a high internal friction coefficient, and provides the friction generating mechanism.

According to a fifth aspect of the present invention, the damper mechanism of the third aspect further has a feature such that the second elastic member is formed of a coil spring, and the friction generating mechanism is formed of a friction generating member attached to the coil spring.

According to a sixth aspect of the present invention, the damper mechanism of the fifth aspect further has a feature such that the friction generating member is formed of an elastic member having a high internal friction coefficient and arranged in the coil spring.

According to a seventh aspect of the present invention, the damper mechanism of the fifth aspect further has a feature such that the damper mechanism further includes a guard member arranged between the elastic member and the coil spring.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

1. First Embodiment (1) Structure

Figure 1:
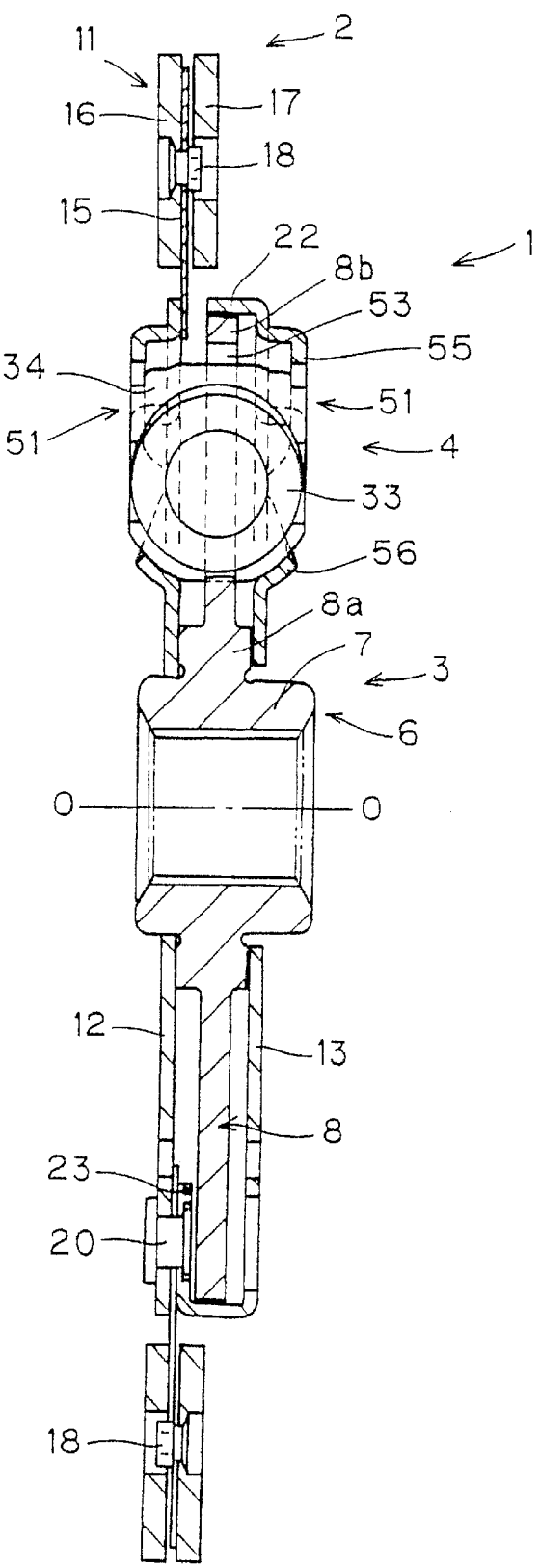
FIG. 1 is a cross-sectional view of a clutch disk assembly in accordance with a preferred embodiment of the present invention.
Figure 2:
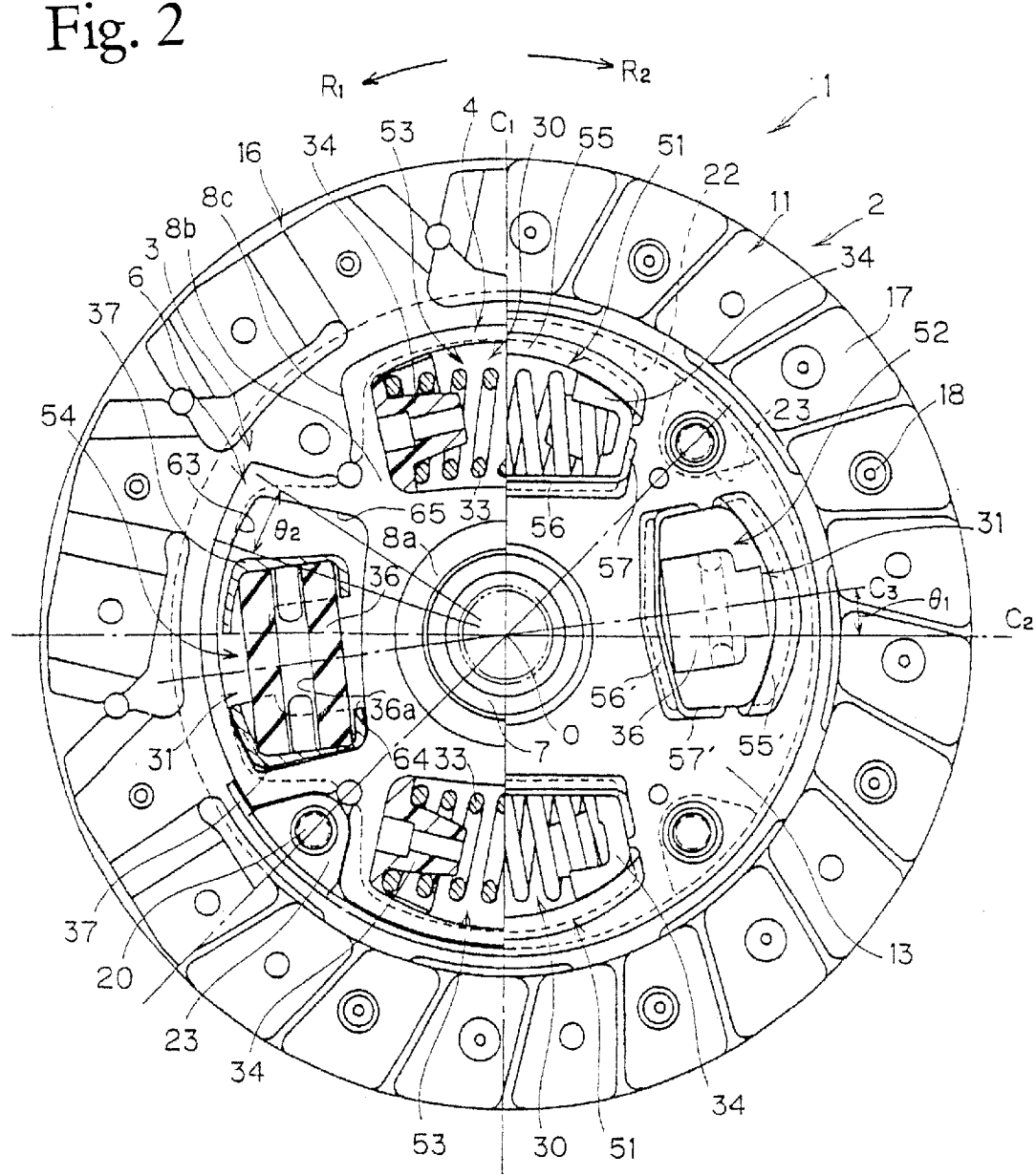
FIG. 2 is an elevational view of the clutch disk assembly of FIG. 1.

FIG. 1 is a cross-sectional view of a clutch disk assembly 1 in accordance with a preferred embodiment of the present invention. FIG. 2 is a elevational view of the same. Referring to FIGS. 1 and 2, the clutch disk assembly 1 is a power transmission device used in a clutch device of a vehicle particularly, a front-engine and front-drive vehicle. The clutch disk assembly 1 has a clutch function and a damper function. The clutch function selectively transmits and intercepts torque by engagement with and disengagement from a flywheel (not shown). The damper function absorbs and damps torque variations and others, which are applied from the flywheel side, by springs and others.

In FIG. 1, 0—0 represents a rotation axis of the clutch disk assembly 1. On the left side in FIG. 1, an engine and a flywheel (both not shown) are arranged. On the right side in FIG. 1, a transmission (not shown) is arranged. In FIG. 2, an arrow R1 indicates the drive side or positive rotating direction of the clutch disk assembly 1, and an arrow R2 indicates an opposite side or negative rotation side. In the following description, the "rotating (circumferential) direction," "axial direction," and "radial direction" represent the respective directions of the clutch disk assembly 1 considered as the rotating body, unless otherwise specified.

The clutch disk assembly 1 is primarily formed of an input rotary member 2, an output rotary member 3, and an elastic coupling mechanism 4. The elastic coupling mechanism 4 is arranged between the rotary members 2 and 3. These members 2 and 3 and the mechanism 4 form a damper mechanism for damping torsional vibrations while transmitting a torque.

The input rotary member 2 is configured to receive the torque from the flywheel (not shown). The input rotary member 2 is primarily formed of a clutch disk 11, a clutch plate 12, and a retaining plate 13. The clutch disk 11 can be pressed against the flywheel (not shown) for engagement therewith. The clutch disk 11 is formed of a cushioning plate 15 as well as a pair of friction facings 16 and 17 fixed to the axially opposite sides of the cushioning plate 15 by rivets 18.

The clutch and retaining plates 12 and 13 are both formed of circular plate members prepared by press working, and are axially spaced from each other by a predetermined distance. The clutch plate 12 is arranged on the engine side, and the retaining plate 13 is arranged on the transmission side. The retaining plate 13 is provided at its radially outer portion with a cylindrical wall 22 extending toward the clutch plate 12. A plurality of fixing portions 23 extend radially inward from the end of the wall 22. The fixing portions 23 are arranged on the side surface, on the transmission side, of the clutch plate 12, and are fixed thereto by a plurality of rivets 20. Thereby, the clutch and retaining plates 12 and 13 rotate together. Also, the above structure helps determine the axial space used by the damper mechanism, as well as the axial distance between the clutch plate 12 and the retaining plate 13. Further, the rivets 20 fix the radially inner portion of the cushioning plate 15 to the fixing portion 23 as well as to the radially outer portion of the clutch plate 12. Each of the clutch and retaining plates 12 and 13 is provided with a central aperture, in which a boss 7 is disposed, as will be described later. Each of the clutch and retaining plates 12 and 13 is provided with a plurality of windows 51 and 52 arranged in the circumferential direction. These windows 51 and 52 in each of the plates 12 and 13 have essentially the same configuration. The windows 51 and 52 are preferably located in four positions, which are circumferentially equally spaced from its opposing window 51 and 52. Each of the windows 51 and 52 are preferably radially equidistance from the rotation axis 0—0 relative to its opposing window. Each of the windows 51 and 52 is substantially circumferential long. In other words, each of the windows 51 and 52 preferably extends more in a circumferential direction than in a radial direction.

The two windows that are vertically opposed to each other in FIG. 2, will be referred to as "first windows" 51, and the two windows that are laterally opposed to each other in FIG. 2, will be referred to as "second windows" 52. Referring to FIG. 1, each first window 51 is formed of a hole opened at its axially opposite ends. Each first window 51 preferably has a support portion formed along an edge of the hole. The support portion has a radially outer support portion 55, a radially inner support portion 56, and circumferential end support portions 57. As seen in FIG. 2, in an elevational view, the radially outer support portion 55 is curved substantially circumferentially, and the radially inner support portion 56 has a substantially straight form. Each of the circumferential end support portions 57 extends substantially linearly in the radial direction, but is not parallel to a radial line C1 extending through a circumferential center of the window 51 and the center 0 of the clutch disk assembly 1. The circumferential end support portion 57 is inclined so that a radially inner end thereof may be shifted circumferentially inward (toward the circumferential center of the window 51 or 52) with respect to a radially outer end. In other words, in each window 51, the radially inner end of the support portion 57 is preferably closer to the opposing radially inner end of the opposing support portion 57 than the radially outer end of the support portion 57 is to its opposing outer end. Therefore, the circumferential end support portions 57 on the opposite sides of each window 51 are not parallel to each other. The radially outer support portion 55 and radially inner support portion 56 are preferably formed by partially cutting and bending the plates 12 and 13.

The second window 52 preferably has substantially the same form as the first window 51, but is circumferentially shorter than the first window 51. Each first window 52 is formed of a hole opened at its axially opposite ends and has a support portion formed along the edge of the hole. The support portion has a radially outer support portion 55', a radially inner support portion 56', and circumferential end support portions 57'. The radially inner support portion 56' is preferably curved so that its circumferentially middle portion is shifted radially inward.

Further, the second windows 52 are opposed to each other in a diametral direction, but are angularly shifted in the rotating direction R1 with respect to the first windows 51. In other words, the R1 side of the second windows 52 is preferably closer to the R2 side of the first windows 51 than the R2 side of the second windows 52 is to the R1 side of the first windows 51. More specifically, a line C3 extending between the circumferential centers of the second windows 52 are angularly shifted in the rotating direction R1 by a predetermined angle $\theta_1$ (7.5 degrees in this embodiment) with respect to a line C2 that is perpendicular to line C1 extending between the circumferential centers of the first windows 51.

Description will now be given on the output rotary member 3. Referring to FIG. 1, the output rotary member 3 is primarily formed of a hub 6. The hub 6 is formed of a boss 7 and a flange 8. The boss 7 has a cylindrical form, and is disposed within the central apertures of the clutch and retaining plates 12 and 13. The boss 7 is spline-engaged with a transmission input shaft (not shown) and fitted into the central aperture. The flange 8 is formed integrally and radially around the boss 7, and has a circular plate-like form. The flange 8 is arranged axially between the clutch and retaining plates 12 and 13. The flange 8 is formed of a radially inner portion 8a and a radially outer portion 8b having a smaller axial size or thickness than that of the inner portion 8a.

As seen in FIG. 2, the flange 8 is provided at its radially outer portion 8b with window apertures 53 and 54 corresponding to the first windows 51 and 52, respectively. These window apertures 53 and 54 are located in the four positions, which are circumferentially equally spaced from their opposing window apertures 53 or 54. Each of the window apertures 53 and 54 are preferably radially equidistance from the rotation axis 0—0. Each of window apertures 53 and 54 functions as a spring accommodating portion.

In FIG. 2, the window apertures in pair, which are vertically opposed to each other, will be referred to as the "first window apertures" 53, and the window apertures in pair, which are laterally opposed to each other in FIG. 2, will be referred to as the "second window apertures" 54. Since the first and second window apertures 53 and 54 have similar configurations, these configurations will now be collectively described. Each of the window apertures 53 and 54 is open at axially opposite ends, and is prepared preferably by axial press working. Each of the window apertures 53 and 54 is circumferentially long. In other words, each of the window apertures 53 and 54 preferably extends more in circumferential direction than in a radial direction. Each of the window apertures 53 and 54 has a radially outer support portion 63, a radially inner support portion 64, and circumferential end support portions 65. In an elevational view, the radially outer support portion 63 is curved substantially circumferentially, and the radially inner support portion 64 has a substantially straight form. Each of the circumferential end support portions 65 extends substantially linearly in the radial direction, but is not parallel to the line C1 or C2 extending through a circumferential center of the window aperture 53 or 54 and the center 0 of the clutch disk assembly 1. The circumferential end support portion 65 is inclined so that the radially inner end may be shifted circumferentially inward with respect to the radially outer end. In other words, in each window aperture 53 or 54, the radially inner end of the circumferential end support portion 65 is preferably closer to the opposing radially inner end of the opposing circumferential end support portion 65 than the radially outer end of the circumferential end support portion 65 is to its opposing outer end.

The first window aperture 53 and the first window 51 have substantially the same circumferential length, and are located in the same circumferential position. The second window aperture 54 and the second window 52 are located in the same position relative to the rotation axis 0—0, but the second window aperture 54 is circumferentially longer than the second window 52. The circumferential end support portion 65 located on the RI side, i.e., forward side in the rotating direction RI of the first window aperture 53 is located in the same circumferential position as the circumferential end support portion 57' on the RI side of the second window 52. However, the circumferential end support portion 65 located on the R2 side of the second window aperture 54 is angularly shifted toward the R2 side from the circumferential end support portion 57' on the R2 side of the second window 52 by a second torsion angle $\theta_2$ (15 degrees in this embodiment). In other words, the R2 side of the second window aperture 54 extends beyond the R2 side of the circumferential end support portion 57' such that the difference between the R2 side circumferential end support portions 55 and 47' is $\theta_2$.

The flange 8 is provided at its radially outer edge with recesses 8c, through which the fixing portions 23 of the retaining plate 13 extend axially. Each recess 8c is located circumferentially between the window apertures 53 and 54.

The elastic coupling mechanism 4 is formed of a plurality of elastic member assemblies 30 and 31. The elastic member assemblies 30 and 31 are arranged within the first window apertures 53 and 54 as well as first windows 51 and 52, respectively. The elastic member assemblies 30 and 31 are formed of two kinds of assemblies, first elastic member assemblies 30 and second elastic member assemblies 31. Each of the first elastic member assemblies 30 is arranged within the first window aperture 53 and the first window 51. Each of the second elastic member assemblies 31 is arranged within the second window aperture 54 and the second window 52. The first elastic member assembly 30 is formed of a coil spring 33 and a pair of seat members 34 arranged on the opposite ends of the spring 33. The coil spring 33 has an elliptic section. Each end of the coil spring 33 is preferably closed and forms an end turn. However, the surface of each end turn is not subjected to polishing, and maintains the sectional form of the coil wire. The "end turn" in this embodiment is the same as one turn of each end of the coil spring 33.

Figure 4:
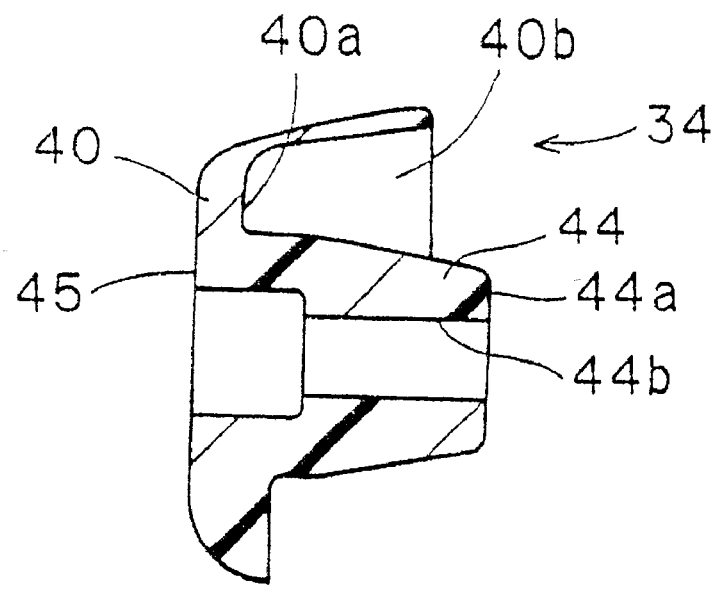
FIG. 4 is a cross-sectional view of a first seat member of the clutch disk assembly.

The seat members 34 are preferably made of hard resin or elastic resin material. For example, the elastic resin material may be thermoplastic polyester elastomer. As shown in FIG. 4, the seat member 34 is provided with a seat portion 40 having a seat surface 40a for receiving an end turn surface of the coil spring 33. The seat portion 40 is provided at its seat surface with a columnar projection 44 so that the seat surface 40a has an annular form. The seat surface 40a has a configuration corresponding to that of the end turn of the coil spring 33, and provides a contact surface (not shown), which is in contact with the leading end surface of the coil spring 33. Thereby, the coil spring 33 cannot rotate around its own axis with respect to the first seat member pair 34. The contact surfaces of the opposite seat members 34 are directed oppositely to each other in the directions of turn of the coil spring 33. Therefore, the coil spring 33 can turn in neither direction around the central axis.

Figure 3:
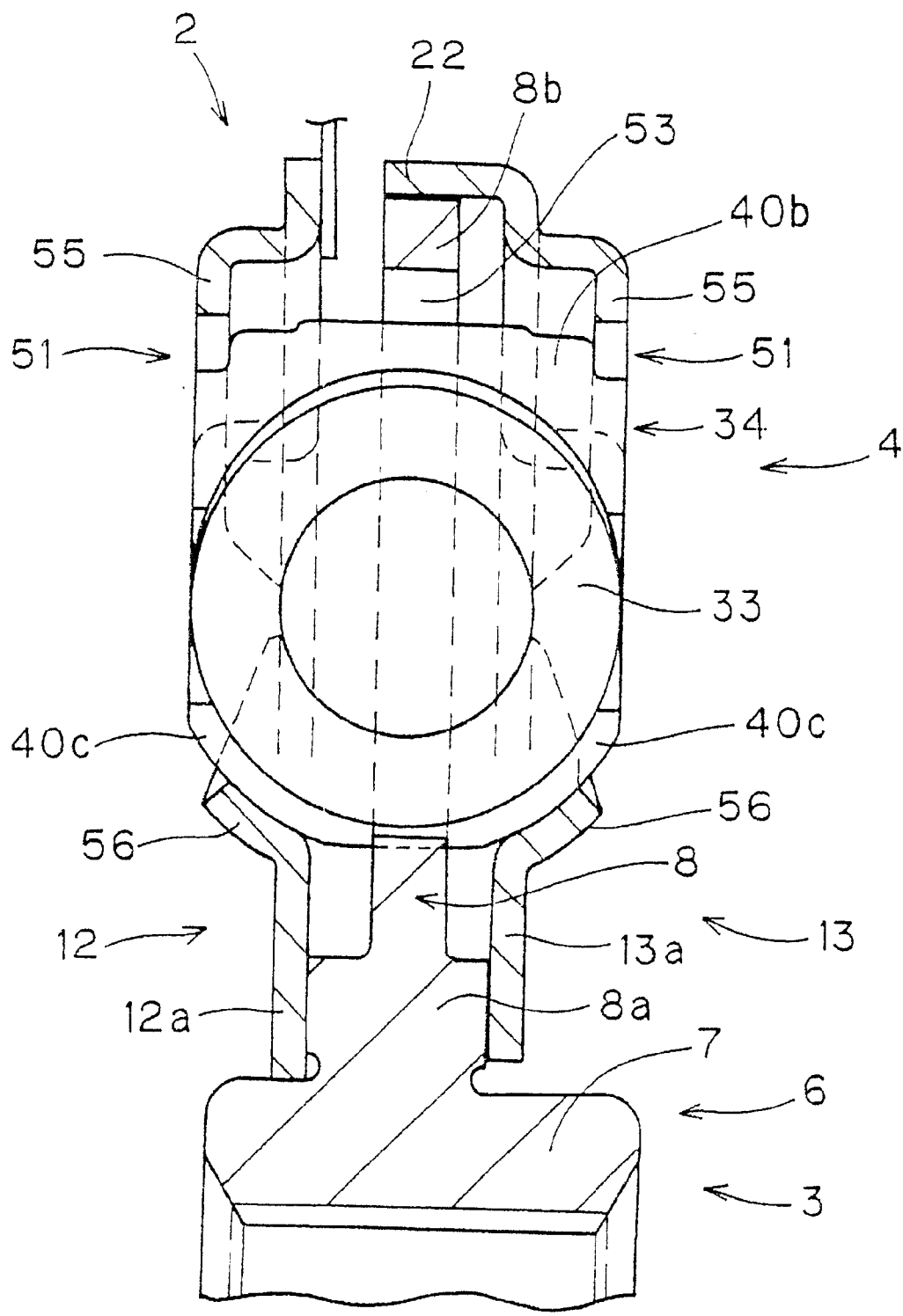
FIG. 3 is a partial cross-sectional view of the clutch disk assembly illustrating on an enlarged scale a structure in FIG. 1.

The projection 44 is formed to converge toward the free end. A flat contact surface 44a is provided on the free end. The seat portion 40 and the projection 44 are provided at their centers with a circumferentially penetrating aperture 44b having a circular section. Referring to FIGS. 2 and 4, a contact surface 45 formed on the seat portion 40 is supported in the rotating direction by the circumferential end support portion 65 of the first window aperture 53 and the circumferential end support portion 57 of the first window 51. The seat portion 40 is provided with a radially outer support portion 40b for supporting the radially outer and axially opposite portions of the end turn of the coil spring 33. The seat portion 41 is also provided with a radially inner support portion 40c for supporting the radially inner and axially opposite portions of the end turn of the coil spring 33. The seat member 34 has a radially outer portion of an arc-shaped section extending along the radially outer support portions 55 and 63. As seen in FIG. 3, the axial movement of the seat member 34 is restricted by the radially outer support portion 55 and radially inner support portion 56 of the first window 51.

Referring now to FIG. 2, the number of active turns of the coil spring 33 is preferably seven on the radially inner side, and six on the radially outer side. Thus, the number of active turns on the radially inner side is preferably larger by one than that on the radially outer side. Since the coil spring 33 cannot rotate around its own axis, the above state is maintained. The above state is maintained because the opposite ends of the coil spring 33 are non-rotatably engaged with the seat members 34 to preventing rotation around its own axis, respectively, and the seat members 34 are non-rotatably engaged with the circumferential end support portions 65 of the flange 8 and the circumferential end support portions 57 of the plates 12 and 13 to prevent its own rotation around the axis of the coil spring 33. Since the number of active turns on the radially inner side is larger than that on the radially outer side as described above, the structure can disperse an excessively large stress due to a large amount of deformation of the radially outer portion into various portions on the radially inner side so that a difference in stress between the radially inner and outer portions can be reduced.

Figure 6:
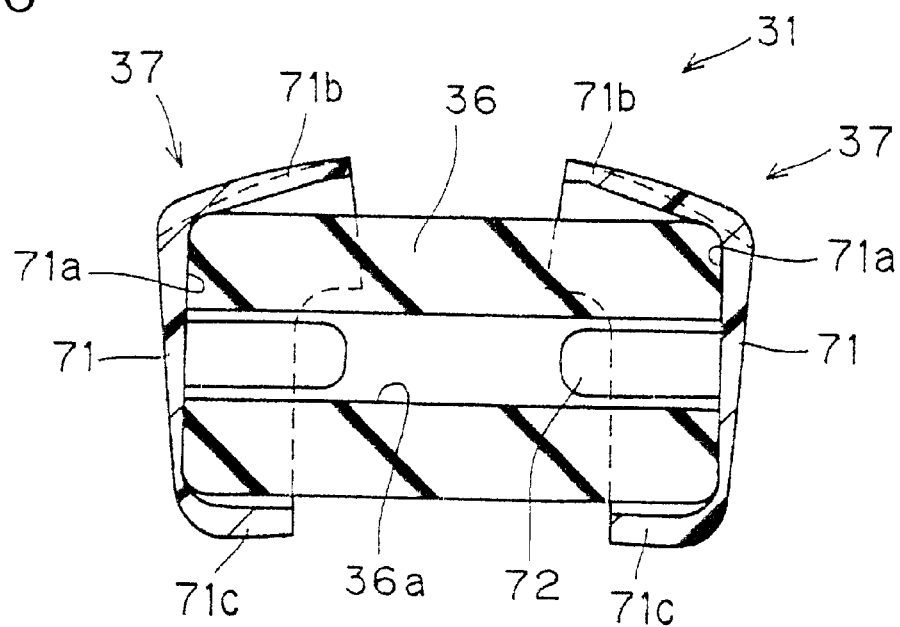
FIG. 6 is a cross-sectional view of a second elastic member assembly of the clutch disk assembly.

With reference to FIG. 6, description will now be given on the second elastic member assembly 31. The second elastic member assembly 31 is formed of an elastic member 36 and seat members 37. The seat members 37 are arranged on opposite ends of the elastic member 36 in the rotating direction of the plates 12 and 13. The elastic member 36 is substantially a columnar member having a circular section, and is preferably made of rubber, resin, or the like. The elastic member 36 is employed for generating a hysteresis torque by its predetermined rigidity and high internal friction. The elastic member 36 is provided at its center with a lengthwise penetrating aperture 36a.

Figure 5:
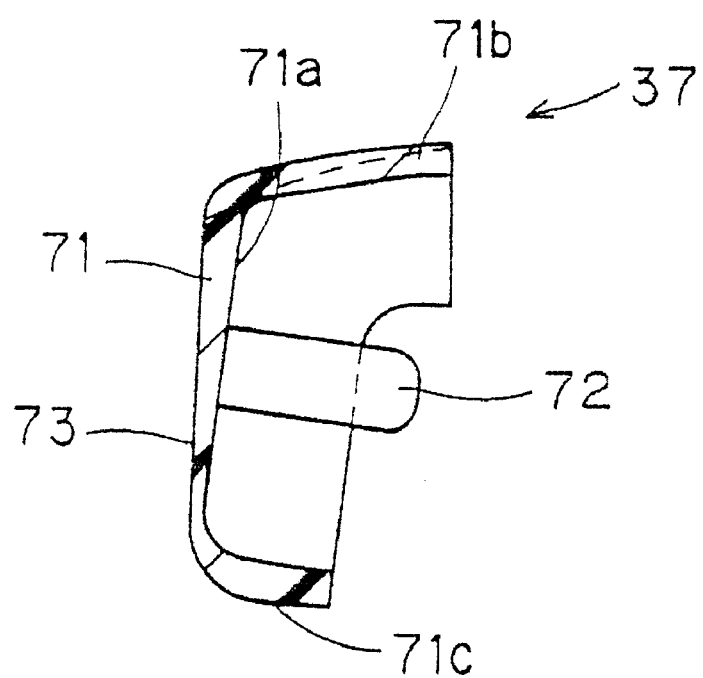
FIG. 5 is a cross-sectional view of a second seat member of the clutch disk assembly.

The seat member 37 is preferably made of hard resin or elastic resin. For example, the elastic resin material may be thermoplastic polyester elastomer. Referring to FIGS. 5 and 6, the seat member 37 is provided with a seat portion 71 having a seat surface 71a for receiving an end surface of the elastic member 36. The seat portion 71 is provided at its seat surface with a columnar projection 72. The projection 72 is fitted into the aperture 36a of the elastic member 36. As sen in FIGS. 2 and 5, a contact surface 73 formed on the seat portion 71 is supported in the rotating direction by the circumferential end support portion 57' of the second window 52. The contact surface 73 on the RI side of the seat member 37 is in contact with the circumferential end support portion 65 of the second window aperture 54, but the contact surface 73 on the R2 side of the seat member 37 is angularly shifted from the circumferential end support portion 65 of the second window aperture 54 by a torsion angle $\theta_2$. The seat portion 71 is provided with a radially outer support portion 71b and a radially inner support portion 71c. The radially outer support portion 71b supports the radially outer and axially opposite portions of the end turn of the elastic member 36, while the a radially inner support portion 71c supports the radially inner and axially opposite portions of the end turn of the elastic member 36. The seat portion 71 has a radially outer portion of an arc-shaped section extending along the radially outer support portions 55 and 63. The axial movement of the seat member 37 is restricted by the radially outer support portion 55 and radially inner support portion 56 of the first window 51.

The elastic member 36, arranged within the second window aperture 54 and the second window 52, can be considered to be a friction generating mechanism. Alternatively, the elastic member 36 can be arranged within a coil spring (not shown) that is preferably supported by the seat member 37. This is apparent from a second embodiment and would be similar to the structure shown in FIG. 11, which includes a spring member separated from a friction generating mechanism, and can achieve a similar effect. Referring again to FIGS. 2 and 5, since the friction generating mechanism formed of the elastic member 36 operates on the positive side, it can attune or control the hysteresis torque generated on the positive side while suppressing a hysteresis torque generated on the negative side so that the negative side hysteresis torque is extremely low.

Referring to FIG. 1, in contrast to a conventional structure, the clutch disk assembly 1 does not have a friction generating mechanism formed of a member such as a friction washer having a high friction coefficient or a member such as a conical spring for producing a biasing force. Therefore, no member is arranged between the input rotary member 2, which is formed of the plates 12 and 13, and the hub 6. Thus, the input rotary member 2 can be in direct contact with the hub 6. More specifically, as shown in FIG. 3, a radially inner portion 12a of the clutch plate 12 can be in axial contact with the end surface on the engine side of the radially inner portion 8a of the hub flange 8. Further, a radially inner portion 13a of the retaining plate 13 can be in axial contact with the end surface on the transmission side of the radially inner portion 8a of the hub flange 8. An axial distance between opposed end surfaces of the radially inner portions 12a and 13a is slightly longer than the axial length of the radially inner portion 8a so that the plates 12 and 13 can slightly shift in the axial direction with respect to the hub 6. The inner peripheral surface of the clutch plate 12 is in contact with the outer peripheral surface of the hub 6 so that input rotary member 2 is radially shifted to the hub 6. The inner peripheral surface of the retaining plate 13 is radially spaced from the outer peripheral surface of the boss 7 by a predetermined distance. According to the structure described above, a minimum sliding resistance unavoidably occurs between the hub 6 and the plates 12 and 13 when relative rotation occurs therebetween. However, this sliding resistance is in a range, which can be considered as a range of an error of a sliding resistance in a conventional structure positively causing the friction. Accordingly, it can be considered that a conventional friction generating mechanism is not present at least axially between the hub 6 and the plates 12 and 13.

(2) Torsion Characteristics

Figure 7:
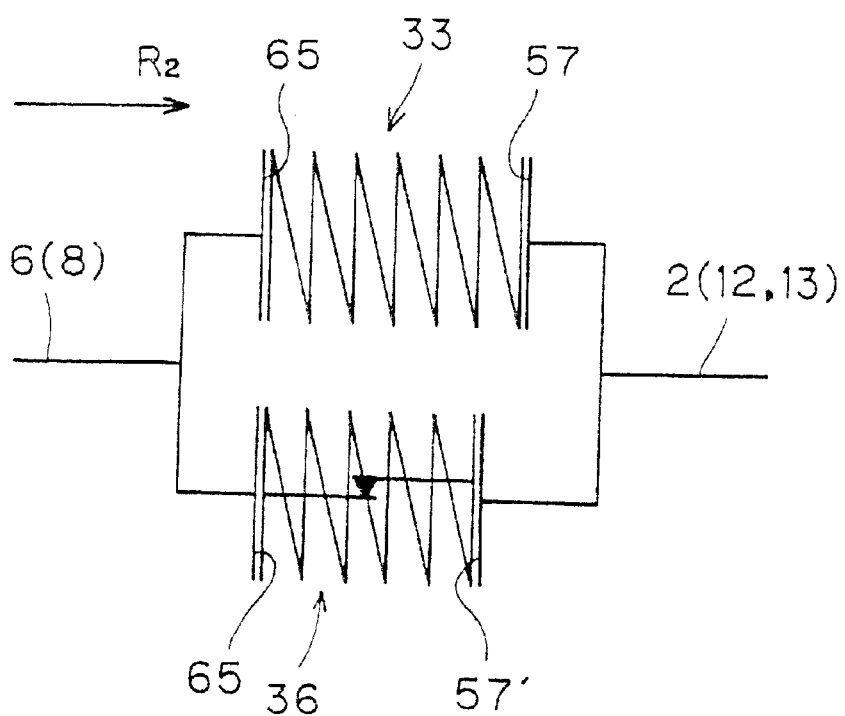
FIG. 7 is a diagrammatical view illustrating a damper mechanism of the clutch disk assembly.
Figure 8:
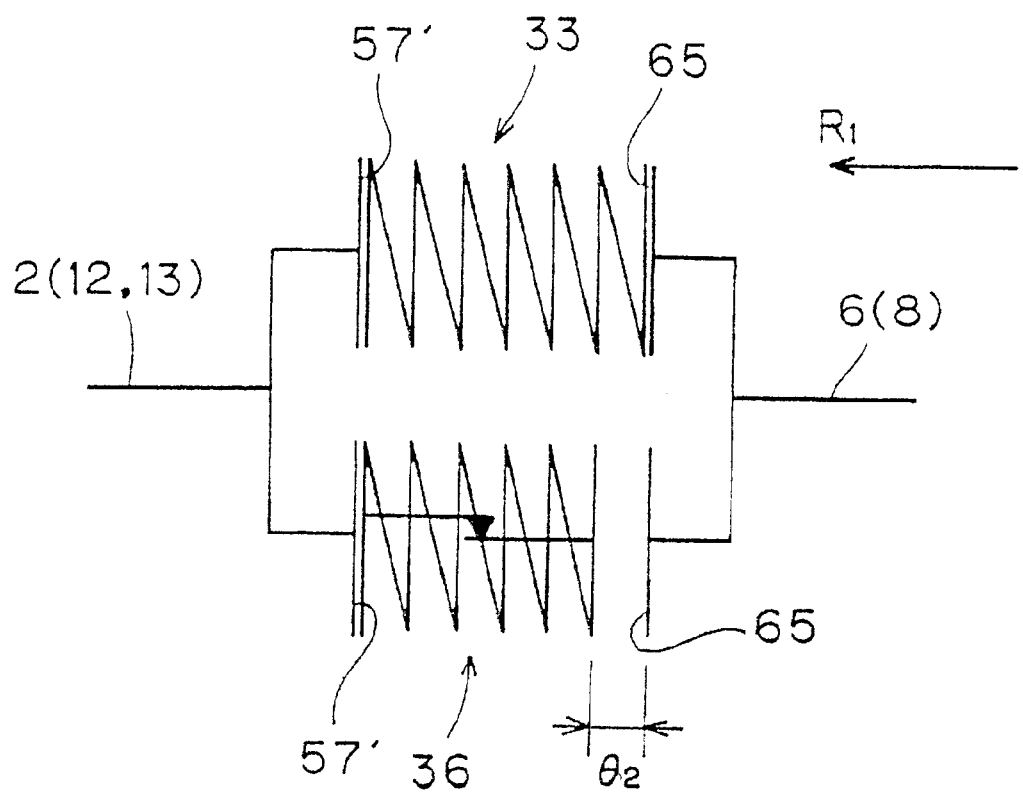
FIG. 8 is a diagrammatical view illustrating the damper mechanism of the clutch disk assembly.
Figure 9:
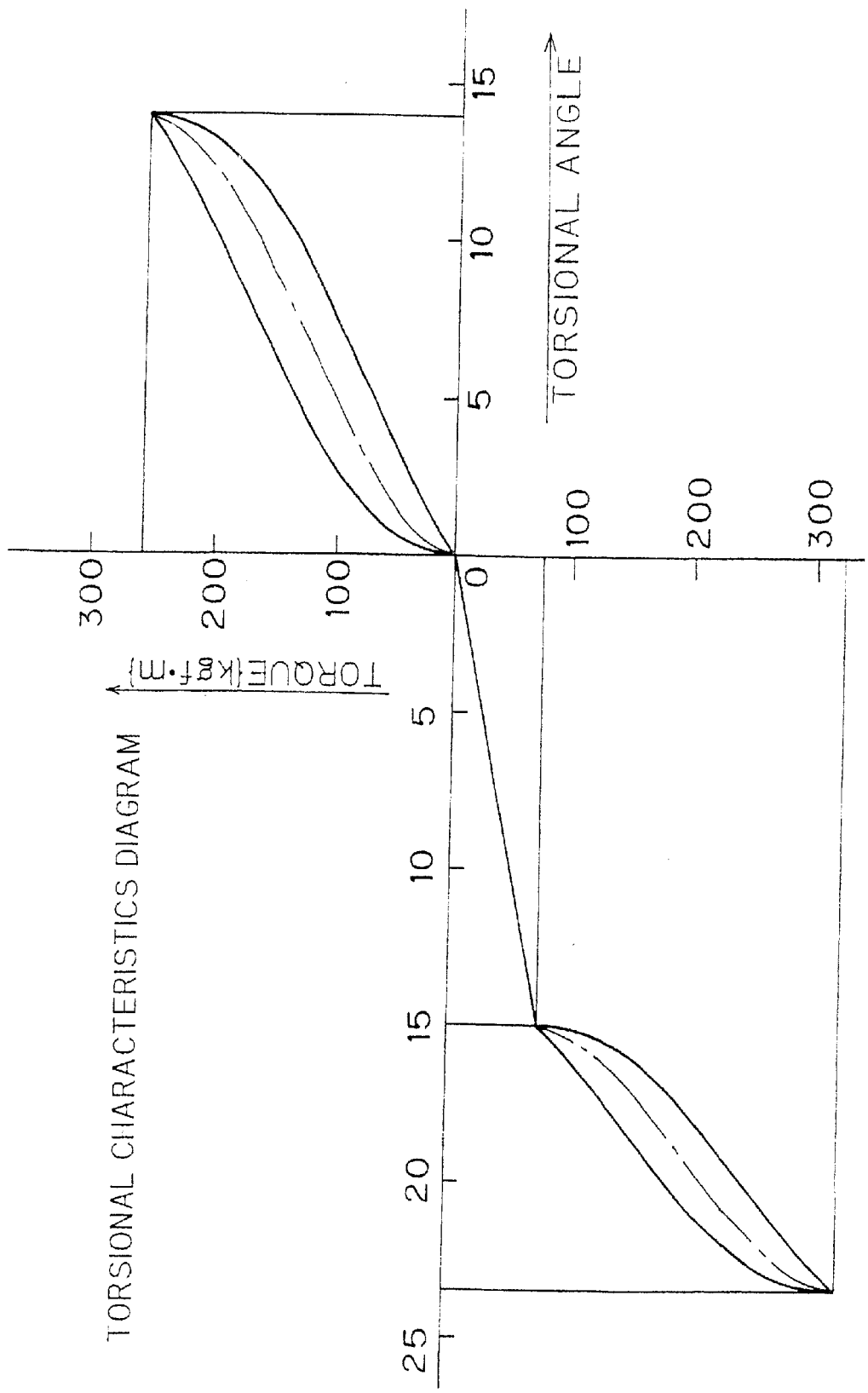
FIG. 9 is a view of a graph showing torsion characteristics of the clutch disk assembly.

Referring to FIGS. 7 and 8 schematically showing the damper mechanism as well as FIG. 9 showing the torsion characteristics, description will now be given on the torsion characteristics of the clutch disk assembly 1. The values in FIG. 9 are represented merely as examples, and the invention is not restricted thereto.

First, description will be given on the case, in which the input rotary member 2 is fixed relative to the hub 6, and the operation starting from the neutral state in FIG. 7 is performed in the positive region of the torsion characteristics to rotate the hub 6 in the rotating direction R2. In this case, the input rotary member 2 twists in the rotating direction R1 with respect to the hub 6. In this operation, the two coil springs 33 and the two elastic members 36 are compressed in parallel so that characteristics of a relatively high rigidity are achieved. Since the two elastic members 36 cause internal friction, a high hysteresis torque is obtained. In this embodiment, the torsion characteristics of a high rigidity and a high hysteresis torque are exhibited throughout the positive side of the torsion characteristics. When the torsion angle reaches a predetermined value, contact occurs between the seat members 34 and between the seat member 37 so that the damper mechanism stops its operation.

Description will now be given on the case, in which the input rotary member 2 is fixed relative to the hub 6, and the operation starting from the neutral state in FIG. 8 is performed in the negative region of the torsion characteristics to rotate the hub 6 in the rotating direction R1. In this case, the input rotary member 2 twists in the rotating direction R2 with respect to the output rotary member 3.

When the torsion angle is small $(0-\theta_2)$, only the two coil springs 33 are compressed. Thus, the two elastic members 36 are not compressed, and no friction occurs. As a result, the characteristics of a low rigidity and a low hysteresis torque can be obtained. When the torsion angle reaches $\theta_2$, the circumferential end support portion 65 on the R2 side of the second window aperture 54 comes into contact with the seat member 34. Thereafter, the two elastic members 36 are compressed in parallel with the two coil springs 33. Therefore, torsion characteristics of a high rigidity and a high hysteresis torque can be obtained. Accordingly, the rigidity in the second region on the negative side is higher than the rigidity on the positive side.

According to the damper mechanism of the invention, as described above, the torsion characteristics exhibit the different torsional rigidities on the positive and negative sides, respectively, and further exhibit the different hysteresis torques on the positive and negative sides, respectively. Thereby, the torsion characteristics, which are good as a whole, can be achieved.

In the prior art, structures having such torsion characteristics have been proposed that the hysteresis torque on the positive side is different from that on the negative side. In addition to the difference in hysteresis torque, the invention provides the difference in torsional rigidity so that more preferable torsion characteristics can be achieved.

More specifically, a high hysteresis torque is achieved on the positive side, the rigidity of which can be lower than that in the prior art, and an extremely low hysteresis torque is achieved in the first region on the negative side. As a result, variations in rotation speed, which may occur when passing through the resonance point, can be suppressed on the positive side of the torsion characteristics, and good damping rates can be achieved throughout the negative side of the torsion characteristics.

(3) Operations and Effects

In particular, the clutch disk assembly 1 according to the present invention can be appropriately employed for improving the vibration characteristics caused by the vehicle structure of the front-engine and front-drive vehicle. More specifically, a FF vehicle employs s drive system of a high rigidity, and therefore has the following vibration characteristics. First, in an FF vehicle, the resonance point remains in a practical operation range even if the torsional rigidity is reduced for improving the noise and vibration performances. Second, if characteristics are employed in which the variations in engine speed are different between the positive or acceleration side and the negative side or deceleration side of the torsion characteristics, and no difference is present in torsion characteristics between the positive and negative sides, good damping performances may be achieved on one side but not on the other side. Thus, using a conventional structure, it is impossible to provide the good damping performances on both the sides.

In the damper mechanism described above, the torsion characteristics on the positive side are different from those on the negative side so that the preferable vibration damping performance can be achieved by a simple structure.

(1) The "preferable vibration damping performance" specifically represents a structure that realizes the torsion characteristics of a constant rigidity and a constant hysteresis torque on the positive side, and at the same time, the torsion characteristics of a low rigidity and a low hysteresis torque on the negative side.

(2) The "simple structure" specifically represents a structure such that a conventional friction generating mechanism is not arranged axially between the hub 6 and the plates 12 and 13, and the elastic member 36 serving as the friction generating mechanism is arranged for operation on only the positive side. More specifically, the elastic member 36 is arranged in the window aperture 52 and the window 54 accommodating the elastic members 33 and 36, respectively to be compressed between the hub 6 and the plates 12 and 13. The plates 12 and 13 are mutually and directly supported in the axial direction, and a conventional friction generating mechanism is not arranged between the plates 12 and 13.

Further, the above structure provides such torsion characteristics on the negative side that substantially no friction occurs, and the hysteresis torque is extremely low.

Alternate Embodiments

Alternate embodiments of the present invention will now be discussed. In view of the similarities between the first embodiment, discussed above, and the alternate embodiments, the components or parts of the alternate embodiments that have the same function of the corresponding components or parts of the first embodiment are being given the identical reference numerals. Moreover, the explanations of components or parts and the operations of the alternate embodiments that are similar to components or parts and the operations of the first embodiment will be omitted. Only components and operations of the alternate embodiments that are different in structure and function from the first embodiment will be explained herein.

Second Embodiment

Figure 10:
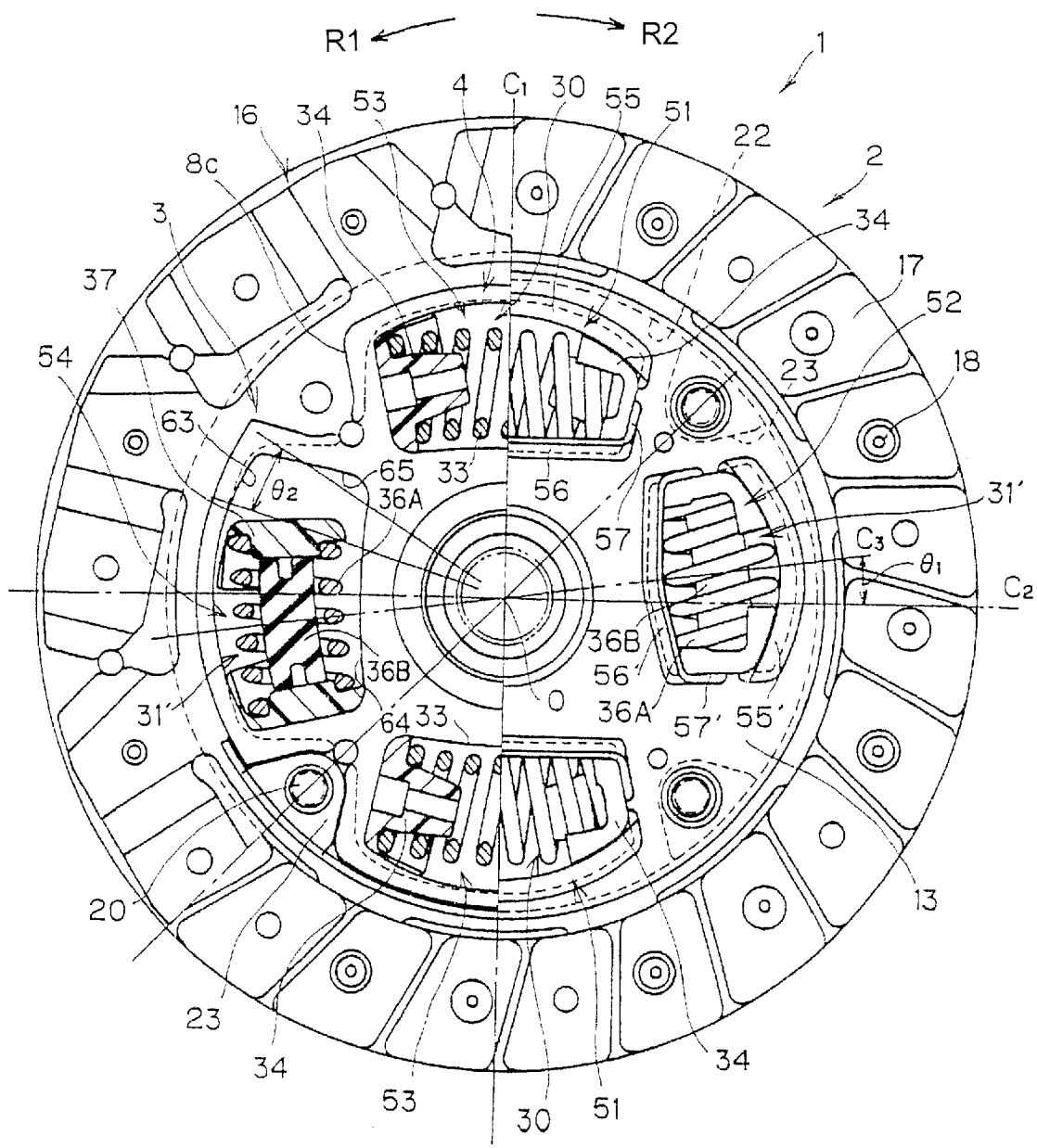
FIG. 10 is an elevational view of a clutch disk assembly in accordance with an alternate embodiment of the present invention.

FIG. 10 is an elevational view illustrating showing the clutch disk assembly 1 in accordance with a second preferred embodiment of the present invention. The structure of this embodiment is basically the same as that of the foregoing embodiment except for the following structures and operations.

Figure 11:
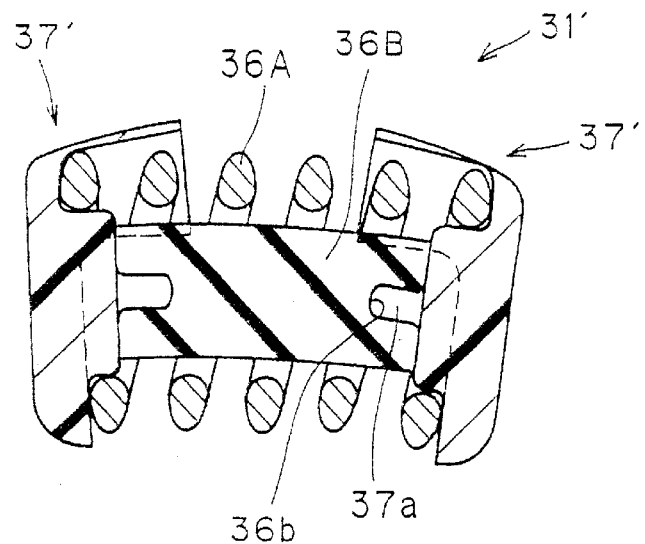
FIG. 11 a cross-sectional view of a second elastic member assembly of the clutch disk assembly of FIG. 10.
Figure 12:
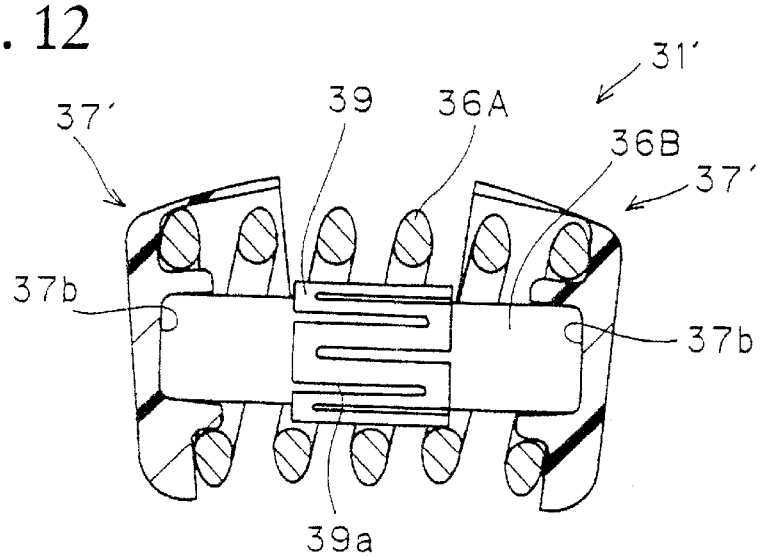
FIG. 12 is a cross-sectional view of a modified second elastic member assembly of the clutch disk assembly of FIG. 10.
Figure 13:
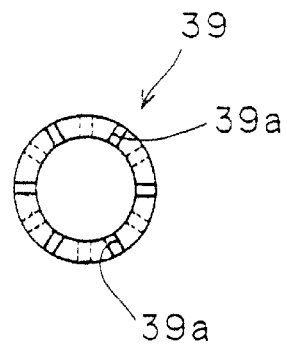
FIG. 13 is an elevational view of a collar of the second elastic member assembly of FIG. 12.
Figure 14:
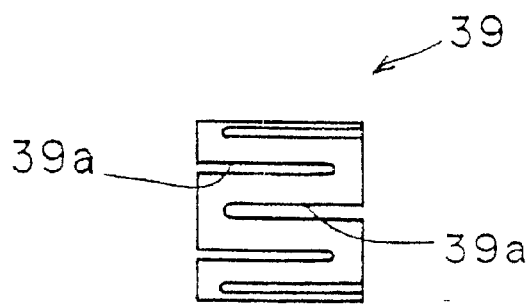
FIG. 14 is a side elevational view of the collar.

A second elastic member assembly 31' is primarily formed of a second coil spring 36A, a pair of seat members 37', and an elastic member 36B. Referring to FIG. 11, seat member 37' is substantially the same as that in the first embodiment, but is provided at a center of its seat surface with a projection 37a. The elastic member 36B has a columnar form extending within the second coil spring 36A. The elastic member 36B is preferably made of, e.g., rubber of elastic resin, and can generate high internal friction when compressed. The elastic member 36B is radially spaced from the inner periphery of the second coil spring 36A. The elastic member 36B is provided at its opposite ends with holes 36b that are engaged with the projections 37a of the seat members 37', respectively. This structure prevents disengagement of the end of the elastic member 36B from the seat member 37.

According to the second embodiment, as described above, the second coil spring 36A (spring) is formed of a member independent of the elastic member 36B (friction generating mechanism). Even in this case, an effect similar to that of the first embodiment can be achieved.

In a modification of the second embodiment, a collar 39 may be arranged around the elastic member 36B as shown in FIGS. 12–17. The collar 39 is a guard or protection member, which prevents direct contact between the second coil spring 36A and the elastic member 36B during sliding, and thereby suppresses wearing and breakage of the elastic member 36B. The collar 39 is a cylindrical member made of a thin plate, and is longitudinally slidable with respect to the elastic member 36B. Thus, the longitudinal size of the collar 39 is shorter than a distance between the seat members 37' on its opposite sides. As can be seen from FIGS. 13 and 14, the collar 39 is preferably provided at its circumferentially spaced positions with a plurality of slits or slots 39a, each of which extends in the longitudinal direction of the collar 39, and is longitudinally shifted with respect to the circumferentially neighboring slits 39a. Thus, the collar 39 is formed of a plurality of narrow bands, which extend longitudinally and are joined together. Owing to the above structure, the collar 39 can expand in the radial direction.

Figure 15:
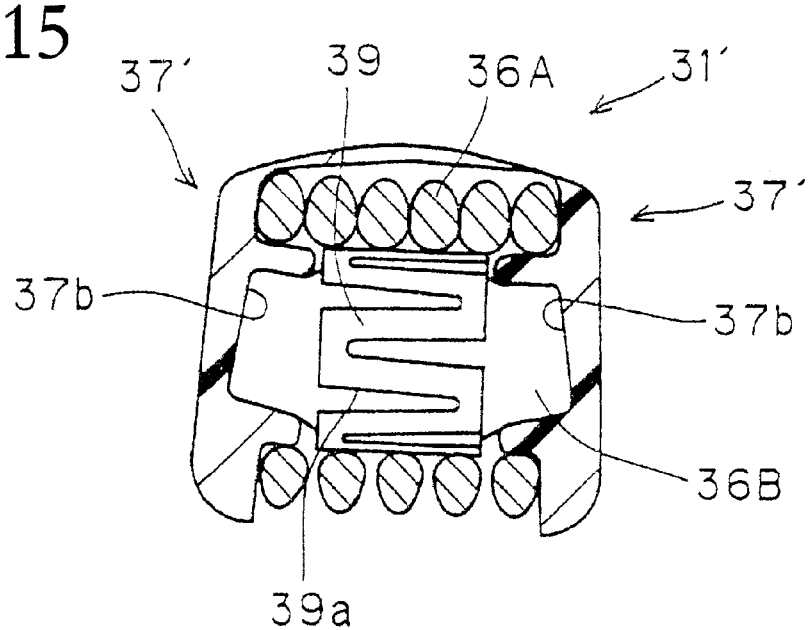
FIG. 15 is a cross-sectional view of the elastic member assembly of FIG. 12 having a coil spring in a compressed state.
Figure 16:
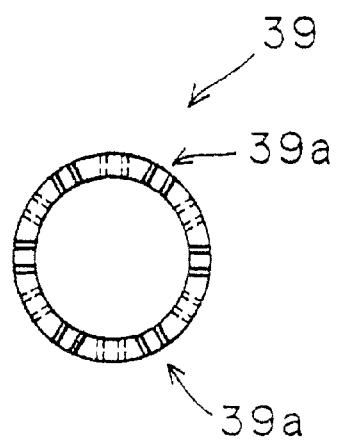
FIG. 16 is an elevational view of the collar in an expanded state.
Figure 17:
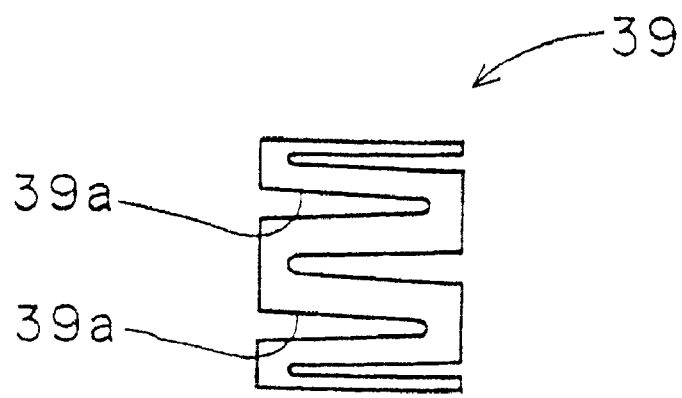
FIG. 17 is a side elevational view of the expanded collar.

FIG. 15 shows a state in which the second coil spring 36A is fully compressed so that radially outer portions of the coils are in contact with each other. In this state, the elastic member 36B is compressed to expand radially from its free state. Thereby, the collar 39 is radially expanded as shown in FIGS. 16 and 17. Since the collar 39 itself is radially deformable, no excessive force is applied to the collar 39. The sliding resistance, which occurs between the collar 39 and the elastic member 36B, can be utilized for vibration damping.

In this modification, the seat member 37' is substantially the same as that of the foregoing embodiment, but is provided at a center of its seat surface with a cavity or hole 37b. Each end of the elastic member 36B is fitted into the cavity 37b of the seat member 37'. This prevents disengagement of the end of the elastic member 36B from the seat member 37.

Other Embodiments

The invention is not restricted to the clutch disk assemblies of the embodiments already described.

(1) In the embodiment already described, no member is arranged between the flange 8 of the hub 6 and the plates 12 and 13. However, a spacer or the like for axial positioning may be arranged therebetween. Similar to the foregoing embodiments, the spacer can be configured to generate no or very little friction. Further, the flange 8 can be in direct and axial contact with the plates 12 and 13 so that it can be considered that an additional friction generating mechanism is not provided.

(2) A structure, which prevents an operation of the elastic member on the negative side of the torsion characteristics until the torsion angle exceeds the predetermined value, is not restricted to those in the foregoing embodiments.

(3) The invention can be employed in a damper disk assembly, in which a boss of a hub is separated from a hub flange for providing a region of a first stage (low rigidity and low hysteresis torque).

(4) The number and positions of the coil spring assemblies are not restricted to those in the foregoing embodiments.

(5) The type and structure of the elastic member are not restricted to those in the foregoing embodiments.

Effect of the Invention

According to the damper mechanism of the invention, the preferable vibration damping performance exhibiting different torsion characteristics on the positive and negative sides can be achieved by the aforementioned simplified simple structures.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2001-145451. The entire disclosure of Japanese Patent Application No. 2001-145451 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A damper mechanism comprising:
    a first rotary member;
    a second rotary member being rotatable with respect to said first rotary member;
    a first elastic member coupling said first and second rotary members together in a rotating direction, being compressed in the rotating direction when relative rotation occurs between said first and second rotary members, and being compressed on positive and negative sides of torsion characteristics; and a second elastic member coupling said first and second rotary members together in the rotating direction, being compressed in the rotating direction when relative rotation occurs between said first and second rotary members, being arranged to operate in parallel in the rotating direction with respect to said first elastic member, being compressed on said positive side of said torsion characteristics, and being compressed on said negative side of said torsion characteristics only in a range when relative rotation between said first rotary member and said second rotary member exceeds a predetermined torsion angle; and a friction generating mechanism being configured to generate a friction resistance only when said second elastic member is compressed in the rotating direction.

2. The damper mechanism according to claim 1, wherein said first rotary member is formed of a pair of circular plate members aligned in an axial direction and provided with a plurality of spring support portions;

said second rotary member has a plate portion arranged between said pair of circular plate members, said second rotary member is provided with a plurality of spring accommodating apertures, and said second rotary member is directly and axially contactable with said paired circular plate members.

3. The damper mechanism according to claim 2, wherein said first elastic member is arranged in at least one of said plurality of spring support portions and at least one of said plurality of spring accommodating apertures, and said first elastic member is compressed on said positive and negative sides of torsion characteristics when relative rotation occurs between said first and second rotary members;

said second elastic member is arranged in at least one of said plurality of spring support portions and at least one of said plurality of spring accommodating apertures, said second elastic member is compressed on said positive side of said torsion characteristics when relative rotation occurs between said first and second rotary members, and said second elastic member is compressed on said negative side of said torsion characteristics only in a range when relative rotation between said first and second rotary members exceeds a predetermined torsion angle.

4. The damper mechanism according to claim 3, wherein said friction generating mechanism is arranged in said second elastic member.

5. The damper mechanism according to claim 4, wherein said second elastic member is formed of an elastic member having a high internal friction coefficient, and provides said friction generating mechanism.

6. The damper mechanism according to claim 4, wherein said second elastic member is formed of a coil spring, and said friction generating mechanism is formed of a friction generating member attached to the coil spring.

7. The damper mechanism according to claim 6, wherein said friction generating member is formed of an elastic member having a high internal friction coefficient and arranged in said coil spring.

8. The damper mechanism according to claim 7, further comprising, a guard member arranged between said elastic member and said coil spring.

9. The damper mechanism according to claim 8, wherein said guard member is a columnar member arranged on a radial periphery of said elastic member, said guard member has a plurality of slits that are arranged to extend in the rotating direction.

10. The damper mechanism according to claim 9, wherein said guard member is configured to expand its circumference.

11. The damper mechanism according to claim 4, wherein said second elastic member is formed of a columnar member comprising a resin or rubber.

12. The damper mechanism according to claim 3, wherein said plurality of spring support portions comprise long spring support portions and small spring support portions, said second elastic member is arranged in at least one of said small spring support portions, each of said small spring support portions have a length that is greater than a length of said at least one of said plurality of spring accommodating apertures in which said second elastic member is arranged.

13. The damper mechanism according to claim 12, wherein said plurality of spring support portions are arranged on a circumference of said first rotary member such that said small spring support portions are alternately arranged between said long spring support portions, and said small spring support portions are arranged to be circumferentially closer to an adjacent one said long spring support portions than to an oppositely adjacent one of said long spring support portions.

14. The damper mechanism according to claim 1, wherein said friction generating mechanism is arranged in said second elastic member.

15. The damper mechanism according to claim 14, wherein said second elastic member is formed of an elastic member having a high internal friction coefficient, and provides said friction generating mechanism.

16. The damper mechanism according to claim 15, wherein said second elastic member is formed of a coil spring, and said friction generating mechanism is formed of a friction generating member attached to the coil spring.

17. The damper mechanism according to claim 16, wherein said friction generating member is formed of an elastic member having a high internal friction coefficient and arranged in said coil spring.

18. The damper mechanism according to claim 17, further comprising:

a guard member arranged between said elastic member and said coil spring.

19. The damper mechanism according to claim 18, wherein said guard member is a columnar member arranged on a radial periphery of said elastic member, said guard member has a plurality of slits that are arranged to extend in the rotating direction.

20. The damper mechanism according to claim 19, wherein said guard member is configured to expand its circumference.

21. The damper mechanism according to claim 20, wherein said second elastic member is formed of a columnar member comprising a resin or rubber.

* * * * *